United States Patent [19]

Ackel

[11] Patent Number: 4,724,045
[45] Date of Patent: Feb. 9, 1988

[54] PULP DECOLOR PROCESS

[75] Inventor: Charles S. Ackel, Norcross, Ga.

[73] Assignee: Stone Container Corp., Chicago, Ill.

[21] Appl. No.: 903,833

[22] Filed: Sep. 3, 1986

Related U.S. Application Data

[63] Continuation of Ser. No. 711,238, Mar. 13, 1985, abandoned.

[51] Int. Cl.$^4$ .............................................. D21C 11/00
[52] U.S. Cl. ...................................... 162/29; 162/60; 210/704; 210/705; 210/707; 210/710; 210/711; 210/725; 210/734; 210/917; 210/928; 422/242
[58] Field of Search .................... 162/16, 29, 60, 163; 422/242, DIG. 3; 210/917, 928, 704, 705, 707, 710, 711, 725, 734; 55/73

[56] References Cited

U.S. PATENT DOCUMENTS

| | | | |
|---|---|---|---|
| 3,412,018 | 11/1968 | Monzie | 210/21 |
| 3,740,363 | 6/1973 | Fuller | 210/18 |
| 3,829,388 | 8/1974 | Lange et al. | 210/928 |
| 4,000,033 | 12/1976 | Nicolle et al. | 162/29 |
| 4,008,161 | 2/1977 | Wong | 210/30 R |
| 4,058,458 | 11/1977 | Svarz | 210/52 |
| 4,089,780 | 5/1978 | Svarz et al. | 210/917 |
| 4,179,329 | 12/1979 | Svarz | 162/29 |
| 4,374,027 | 2/1983 | Severeid et al. | 210/608 |
| 4,490,257 | 12/1984 | Becker | 210/610 |

FOREIGN PATENT DOCUMENTS 445623 6/1975 U.S.S.R. .............................. 210/928

OTHER PUBLICATIONS

"The Fuller Treatment System", The Rust Engineering Co. Brochure.
"Waste Water Treatment and Disposal Options", Jordan Associates, Study Conducted for Continental Forest Ind., Nov. 1982, pp. B-11 to B-38.

*Primary Examiner*—Peter Chin
*Attorney, Agent, or Firm*—Jones, Day, Reavis & Pogue

[57] ABSTRACT

A process for the decolorization of alkaline pulp such as that derived from paper waste water wherein the waste water is contacted with a strong mineral acid, contacted with a coagulated agent and then the solid coagulum is separated and neutralized to liquify the color bodies in concentrated form.

9 Claims, No Drawings

PULP DECOLOR PROCESS

This application is a continuation, of application Ser. No. 711,238, filed 3/13/85 abandoned.

This invention relates to the decolorization of pulp and paper waste waters, and more particularly to a process for the resource recovery of the organic materials removed by the decolorization process.

Pulp and paper waste waters have presented, for many years, a formidable waste treatment problem. For example, typical kraft pulp mills generate millions of gallons of waste water everyday containing suspended and colloidal solids made up chiefly of pulp fibers and color bodies, usually in the form of lignins and the products of the oxidation and thermal degradation of wood sugars. The latter waste causes the primary concern because of the high biological oxygen demand and nonaesthetic characteristics of such wastes if treated conventionally.

Various techniques have been proposed to remove the colloidal color bodies, suspended solids and associated high BOD. One technique has involved the addition of massive quantities of lime to the waste water form which pulp fibers and ligneous matter have been separated. The lime addition flocculates the color bodies and thereby reduces the initial waste water color of the waste stream by 80-90% as well as significantly reducing the BOD. That technique has a significant disadvantage in that it involves high capital and operating costs. In addition, such wate water techniques do not allow for recovery of the pulp of lignatious material collected by the process. Finally, the quantities of lime employed pose very significant problems in lime handling, sludge removal and ultimate waste water quality.

It has also been proposed to contact such waste waters with an ion exchange resin which is capable of absorbing the lignins and their derivatives. Ion exchange resins for that purpose have generally been highly cross linked, hydrophilic acrylic copolymers which absorb the organic components by means of Van der Waal's forces.

One of the primary disadvantages of the ion exchange technique is that the resin removes free chloride ions as well as the color bodies. When the ion exchange resin is regenerated, the chloride ions thus released have a tendency to build up in the system to create high chloride levels. That method is also extremely costly.

It is accordingly an object of the present invention to provide a process of decolorizing pulp and paper waste waters containing color bodies which overcomes the foregoing disadvantages.

It is a more specific object of the present invention to provide a process for the decolorization of alkaline pulp and paper waste waters containing as color bodies lignins and derivatives thereof which can be carried out at low cost without substantial capital outlays and which is capable of substantially complete recovery of wasted pulp and lignatious materials.

These and other objects of the present invention will appear more fully hereinafter.

The concepts of the present invention reside in a process for the decolorization of pulp and paper waste water which contain color bodies in which the waste water is first contacted with a strong acid to adjust the pH of the waste water to below 2.5 and then contacting the resulting solution with a coagulating polymer capable of coagulating the color bodies. The coagulated color bodies can thus be separated efficiently and inexpensively and then returned to a dissolved or suspended state by adjusting the pH of the solid coagulum to about 9. The collected pulp and black liquor mixture can then be conveniently recovered.

It has been surprisingly found, in accordance with the practice of the present invention, that the combination of the steps of acidifying the normally alkaline waste water and contacting the resulting acid solution with coagulants provides a flock which natrually floats. Because the waste water contains a substantial amount of sulfide and carbonate salts, the acidification step causes carbon dioxide and reduced sulfur gases to be liberated and the coagulated flock is thus carried to the surface of the liquid by means of the escaping gases.

A waste water from pulp and paper processing which contains color bodies, usually in the form of lignins, their oxidation products and their degradation products as well as a substantial amount of pulp and carbonate salts are passed to a reaction vessel where it is intimately admixed with a strong mineral acid, preferably sulphuric acid, to adjust the normal alkaline pH of the waste water to a pH below 2.5 and with a coagulant in a coagulation vessel whereby carbon dioxide and sulfur gases, usually small quantities of hydrogen sulfide, are liberated. The escaping gases cause the color bodies which have been coagulated to form a flock which rises to the surface of the waste water for separation therefrom in a separation vessel. The clarified and substantially color reduced (straw colored) liquid is then removed for additional biological treatment in accordance with conventional processing techniques.

The solid coagulum is then passed to a recovery vessel where it is contacted with a strong base, usually an alkali metal hydroxide, such as sodium hydroxide or potassium hydroxide, to adjust the pH of the solid coagulum to a level of about 9. The neutralization of the coagulum thus causes the color to be returned to a liquid or colloidal state to form a weak black liquor-pulp mixture which can then be returned to the brown stock washing system typical to all kraft pulp mills. The color bodies present in the black liquor in a suspended or colloidal state have relatively high BTU values, the collected fiber has value in the paper making process. Recovery of these materials in a form compatible with the brown stock washing system represents the reuse of valuable materials and a coincidental reduction of wasted organics from pulp mill waste waters.

It is also possible to recover sulfur values by simply scrubbing the sulfur gases, notably hyrogen sulfide, with sodium hydroxide in the rcovery vessel.

The acid employed in the coagulation step is, as indicated above, preferably a strong mineral acid such as hydrochloric acid, phosphoric acid, nitric acid or sulfuric acid. For reasons of economy and compatibility with paper processing technology, it is generally preferred to employ sulfuric acid as the coagulant. The amount of sulfuric acid can be varied within relatively wide limits, depending in large measure on the characteristics of the waste water undergoing treatment. In general, it is preferred to employ an amount of sulfuric acid sufficient to coagulate the color bodies in the waste water and assure that the pH is reduced to below 2.5.

The coagulant employed in the practiced of this invention can be any of a variety of coagulants commonly employed in processing of paper waste waters. Particularly preferred are polyacrylamide flocculants, such as the polyacrylamides marketed by Nalco, Chem-Link, Hercules, et al. The preferred polymers are high molecular weight and anionically charged; typically the higher the molecular weight and charge density, the better the performance. The amount of the flocculant is generally an amount sufficient to substantially completely effect coagulation of the color bodies present. Best results are usually acheived when the ratio of coagulant to acid is within the range of one pound of polymer for each 100 lbs. of sulfuric acid required to reach a pH of 2.5. As will be appreciated by those skilled in the art, greater or lesser quantities of the coagulating agent may be used depending to some extent on the composition of the waste water.

This technique, with some minor modification, primarily the addition of dissolved air in vessel number, can be used to separate and remove ligatious material from kraft black liquor. It can also be used to remove ligatious material from pulping waste waters which contain no fiber.

It will be understood the various changes and modifications can be made in the details of procedure, formulation and use without departing from the spirit of the invention, especially as defined in the following claims.

I claim:

1. A process for the decolorization of alkaline pulp and paper waste waters containing color bodies in weak black liquor, the process comprising the steps of:
   (a) contacting the waste water with sulphuric acid to adjust the pH to below 2.5;
   (b) contacting the resulting solution with anionic polyacrylamide coagulating agent to coagulate the color bodies;
   (c) separating the solid coagulated color bodies by floatation separation;
   (d) contacting the coagulated color bodies with a base to adjust the pH to above 9.0 to liquify the color bodies in concentrate form.

2. A process for the removal of colored bodies in weak black liquor from pulp and paper waste waters containing sulfide and carbonate salts, the process comprising the steps of:
   (a) admixing the waste water with mineral acid to adjust the pH to below 2.5 and with polyacrylamide to coagulate the color bodies; and
   (b) removal of coagulated colored bodies from the surface of the waste water, the coagulated colored bodies being carried to the surface of the waste water by means of bubbles of carbon dioxide and reduced sulfur formed in the waste water by reaction of the strong mineral acid with the sulfide and carbonate salts.

3. The process of claim 2 wherein the mineral acid is sulphuric acid.

4. A process for the decolorization of alakaline pulp and paper waste waters containing color bodies in weak black liquor, the process comprising the steps of:
   (a) contacting the waste water with a strong mineral acid to adjust the pH to below 2.5;
   (b) contacting the resulting solution with polyacrylamide to coagulate the color bodies in the waste water; and
   (c) removing the coagulated color bodies from the waste water by floatation separation.

5. The process of claim 4, further comprising the step of contacting the removed coagulated color bodies with a strong base to result in a pH of about 9, causing the colored bodies to become a liquor-pulp mixture in a fluid state.

6. A process as claimed in claim 4 wherein the mineral acid is sulfuric acid.

7. A process as claimed in claim 4 which includes the step of scrubbing the sulfur gases being produced by reaction of the mineral acid with the waste water to recover sulfur values therefrom.

8. A process for the removal and recovery of color bodies in the form of lignins, and fiber derivaties thereof from alkaline pulp and paper waster wasters, the process comprising the steps of:
   (a) contacting the waste water with strong mineral acid to adjust the pH to below 2.5;
   (b) contacting the resulting acidic waste water with a coagulating agent to coagulate the color bodies in the waste water;
   (c) separating the coagulated colored bodies from the waste water;
   (d) contacting the separated colored bodies with a strong base to produce a basic pH, thereby causing the colored bodies to become a liquor-pulp mixture in a liquid or colloidal state; and
   (e) returning the liquor-pulp mixture to the brown stock washing system to recover materials therein; whereby sludge disopsal is reduced and fiber recovered.

9. A process as claimed in claim 8 wherein the base sodium hydroxide.

* * * * *